United States Patent
Roger et al.

(10) Patent No.: US 10,151,826 B2
(45) Date of Patent: Dec. 11, 2018

(54) RADAR EMPLOYING PREACQUISITION RAMPS

(71) Applicant: Infineon Technologies AG, Neubiberg (DE)

(72) Inventors: Andre Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 351 days.

(21) Appl. No.: 15/044,445

(22) Filed: Feb. 16, 2016

(65) Prior Publication Data

US 2017/0234968 A1    Aug. 17, 2017

(51) Int. Cl.
    G01S 13/34   (2006.01)
    G01S 7/288   (2006.01)
    G01S 7/292   (2006.01)
    G01S 13/93   (2006.01)
    G01S 7/35    (2006.01)
    G01S 13/524  (2006.01)

(52) U.S. Cl.
    CPC ............ G01S 7/288 (2013.01); G01S 7/2927 (2013.01); G01S 7/354 (2013.01); G01S 13/343 (2013.01); G01S 13/931 (2013.01); G01S 13/5246 (2013.01); G01S 2007/2883 (2013.01); G01S 2007/356 (2013.01)

(58) Field of Classification Search
    CPC .. G01S 13/343; G01S 13/5246; G01S 13/931; G01S 2007/2883; G01S 2007/356; G01S 7/288; G01S 7/2927; G01S 7/354
    USPC .......................................................... 342/93
    See application file for complete search history.

(56) References Cited

U.S. PATENT DOCUMENTS

| | | | |
|---|---|---|---|
| 5,678,131 A | 10/1997 | Alexandrovich et al. | |
| 8,164,511 B2 | 4/2012 | Kishida | |
| 2012/0235857 A1 | 9/2012 | Kim | |
| 2016/0139254 A1* | 5/2016 | Wittenberg | G01S 7/354 |
| | | | 342/27 |

FOREIGN PATENT DOCUMENTS

| | | |
|---|---|---|
| JP | H0372286 A | 3/1991 |
| JP | H09145826 A | 6/1997 |
| JP | H10282229 A | 10/1998 |
| JP | 2004271262 A | 9/2004 |
| JP | 2006091027 A | 4/2006 |
| JP | 2013221893 A | 10/2013 |
| JP | 2014185973 A | 10/2014 |

* cited by examiner

*Primary Examiner* — Timothy A Brainard
(74) *Attorney, Agent, or Firm* — Eschweiler & Potashnik, LLC

(57) ABSTRACT

Techniques for radar detection based on preacquisition ramps are discussed. One example system comprises transmitter circuitry, receiver circuitry, and one or more processors. The transmitter circuitry can transmit preacquisition ramps and acquisition ramps. The receiver circuitry can receive preacquisition signals and acquisition signals based on interactions between the environment and the preacquisition ramps and acquisition ramps, respectively. The one or more processors can perform preprocessing based on the preacquisition signals to obtain interim results based on one or more of the environment or the system; generate a range Doppler map based at least in part on the acquisition signals; and evaluate the range Doppler map based at least in part on the interim results.

20 Claims, 4 Drawing Sheets

RADAR EMPLOYING PREACQUISITION RAMPS

FIELD

The present disclosure relates to radar employing preacquisition ramps that can reduce processing time of the radar and reaction times of systems (e.g., automotive, etc.) employing embodiments discussed herein.

BACKGROUND

Conventional automotive radar systems employ short wave radar (e.g., in the 77 GHz band, etc.) for collision detection, autonomous driving, adaptive cruise control, and other tasks. Conventional automotive radar systems employ a continuous wave radar system with alternating periods of acquisition of radar signals and computation based on the acquired signals to reach a decision. Conventional improvements to automotive radar have focused on improving computation performance to reduce the time between a new acquisition and the resulting decision.

DETAILED DESCRIPTION

Figure 1:
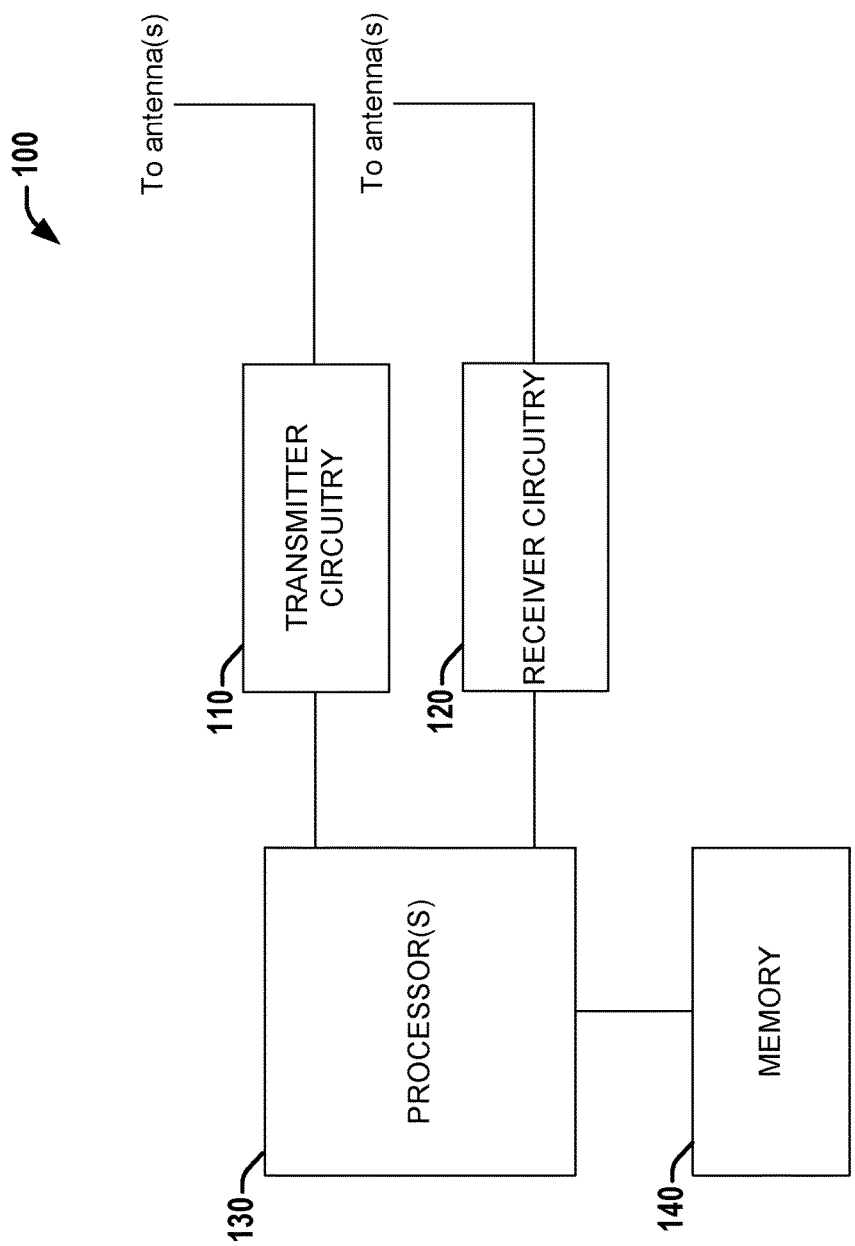
FIG. 1 is a block diagram illustrating a system that facilitates radar detection and analysis based on preacquisition ramps according to various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Embodiments disclosed herein can employ radar based at least in part on preacquisition ramps (or sweeps, chirps, etc.). A relatively small number of preacquisition ramps can be acquired and processed prior to acquisition and processing of a larger number of acquisition ramps. The preacquisition ramps can be processed to obtain interim results that can reduce the processing time of the regular acquisition ramps. The interim results can include determination of parameters associated with the radar system (e.g., temperature, voltage, etc.), environmental conditions (e.g., rain, snow, relative speed, etc.), identification of areas associated with a range Doppler map, determination of a constant false alarm rate (CFAR) algorithm or associated parameters for identified areas, etc.

Referring initially to FIG. 1, illustrated is a block diagram of a system 100 that can facilitate radar detection and analysis based on preacquisition ramps according to various aspects described herein. System 100 can include transmitter circuitry 110, receiver circuitry 120, one or more processors 130, and memory 140 (which can comprise any of a variety of storage mediums and can store instructions and/or data associated with one or more of transmitter circuitry 110, receiver circuitry 120, or the one or more processors 130). Transmitter circuitry 110 and receiver circuitry 120 can each be coupled to one or more antennas. In various aspects, system 100 can be implemented within a vehicular (e.g., automotive, etc.) radar system. In some aspects, system 100 can be implemented within a monolithic microwave integrated circuit (MMIC).

Transmitter circuitry 110 can transmit a plurality of radar ramps (or sweeps, chirps, etc.) according to a continuous wave (CW) transmission mode, such as a frequency modulated CW (FMCW) mode, a phase modulated CW (PMCW)

mode, etc. The set of radar ramps can be transmitted continuously over one or more periods, each of which can include preacquisition ramps (which can be received by receiver circuitry 120 after interacting with the environment for preprocessing by the one or more processors 130) and acquisition ramps (which can be received by receiver circuitry 120 after interacting with the environment for processing and any resulting decision by the one or more processors 130). Additionally, transmitter circuitry 110 can optionally transmit one or more dummy ramps (which are not received by receiver circuitry 120 for processing by the one or more processors 130), which can be transmitted between the preacquisition ramps and the acquisition ramps. The number of preacquisition ramps transmitted by transmitter circuitry 110 in a period can be M, where M can be any positive integer (e.g., at least two, up to sixteen, more, or less, etc.). The number of acquisition ramps transmitted by transmitter circuitry 110 in a period can be N, where N can be any positive integer (e.g., 64, 128, 256, 512, more, or less, etc.).

Receiver circuitry 120 can receive signals each period based on interactions between the environment and radar ramps transmitted by transmitter circuitry 110. Each period, receiver circuitry 120 can receive M preacquisition signals based on the interactions between the M preacquisition ramps and the environment, and can receive N acquisition signals based on the interactions between the N acquisition signals and the environment.

The one or more processors 130 (i.e., either all or at least one of them) can perform preprocessing based on the N preacquisition signals, and obtain interim results. Based at least on the acquisition signals (and potentially preacquisition signals), the one or more processors 130 can generate a range Doppler map associated with the environment. Based on the interim results, the one or more processors 130 can evaluate the range Doppler map, for example, to determine whether any action should be taken (e.g., to avoid a collision, etc.).

The interim results can include instantaneous parameters associated with system 100 (e.g., temperature, voltage, etc.), or can include environmental conditions, such as noise or clutter associated with the environment (e.g., from rain, etc.). Additionally, the interim results can include a preliminary range Doppler map that can be refined based on processing of the acquisition signals into a final range Doppler map from which results are determined. In aspects, the interim results can also include identification of one or more regions of the range Doppler map (e.g., a preliminary range Doppler map based on preacquisition signals), and can optionally include determination of a constant false alarm rate (CFAR) algorithm and/or one or more CFAR parameters for at least one (or all) of the identified regions.

The range Doppler map can be generated by the one or more processors 130 based on the acquisition signals and can optionally also be based on the preacquisition signals. The one or more processors 130 can perform fast Fourier transforms (FFTs) on the M preacquisition signals and on the N acquisition signals, which can be performed by at least one of the one or more processors (e.g., by the only processor in embodiments with one, by one or two in embodiments with two, etc.). Based on the FFTs performed on the M preacquisition signals and on the N acquisition signals, the one or more processors can generate a range Doppler map that can be refined as more FFTs are performed by the one or more processors.

In one example set of embodiments, the one or more processors 130 can include at least two processors comprising at least a first processor (e.g., a radar signal processing unit (SPU) which can be configured for accelerated processing of FFTs, etc.) that is configured to perform the FFTs on the preacquisition signals and acquisition signals, and a second processor (e.g., a TriCore processor, etc.) that can determine characteristics or parameters that can facilitate thresholding performed by the first processor, such as optionally selecting and evaluating CFAR algorithms based on the preacquisition signals, etc.

Figure 2:
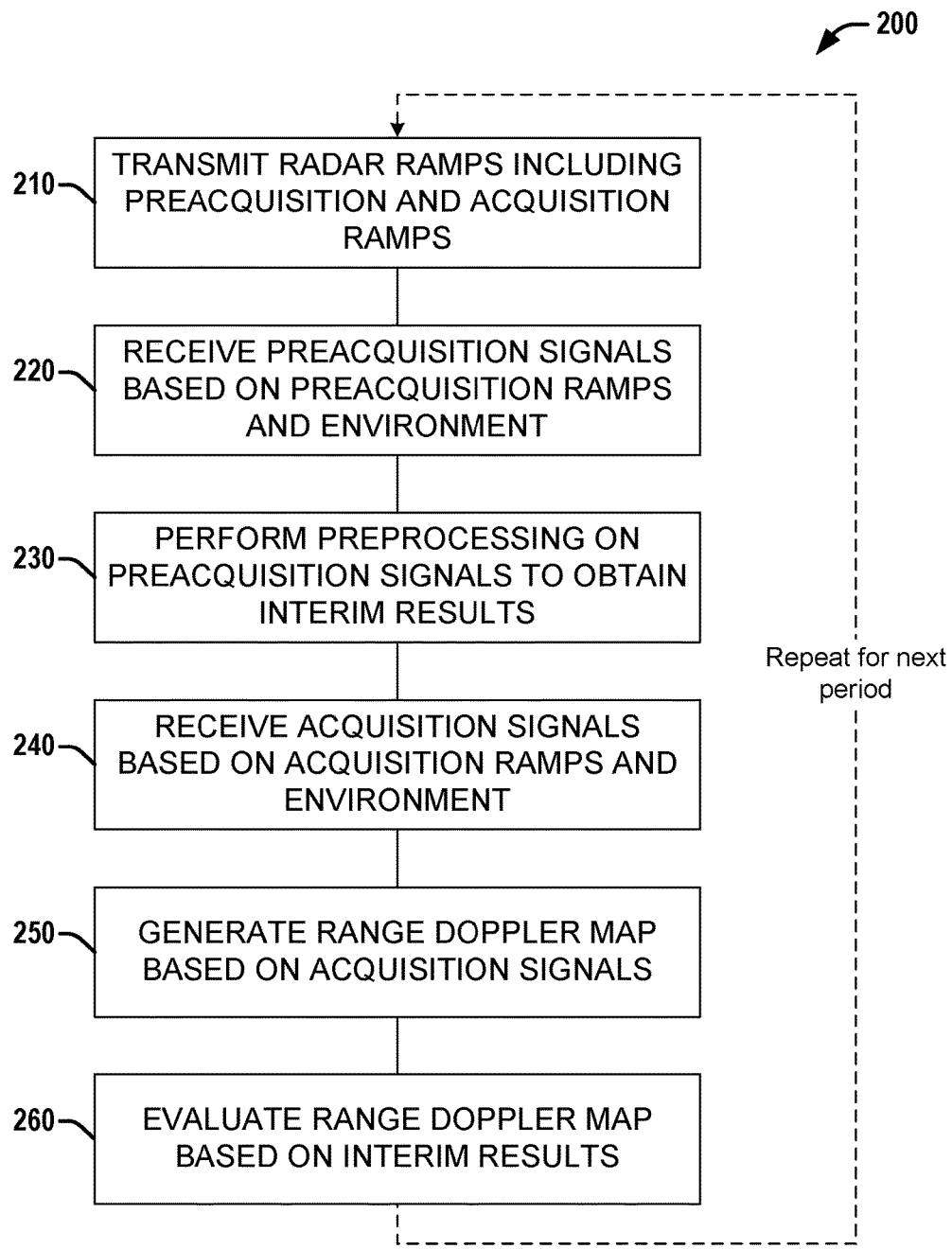
FIG. 2 is a flow diagram illustrating a method that facilitates radar detection and analysis based on preacquisition ramps according to various aspects described herein.

Referring to FIG. 2, illustrated is a flow diagram of a method 200 of facilitating radar detection and analysis based on preacquisition ramps according to various aspects described herein. In some aspects, method 200 can be performed at a vehicular radar system (e.g., via an MMIC). In other aspects, a machine readable medium can store instructions associated with method 200 that, when executed, can cause a vehicular radar system to perform the acts of method 200.

At 210, a plurality of radar ramps can be transmitted, which can include a set of preacquisition ramps and a set of acquisition ramps.

At 220, preacquisition signals can be received based on the interactions of the environment with the preacquisition ramps.

At 230, preprocessing can be performed on the preacquisition signals to obtain interim results. The interim results can indicate one or more characteristics or parameters of a system implementing method 200 (e.g., a temperature, voltage, etc.) or of the environment (e.g., noise, clutter, etc.). In some aspects, the interim results can include a preliminary range Doppler map that can be refined based on additional signals, and can identify one or more regions of the range Doppler map (e.g., homogeneous regions, nonhomogeneous regions, etc.), and can indicate a CFAR algorithm or associated parameters for each identified region or a subset thereof.

At 240, acquisition signals can be received based on the interactions of the environment with the acquisition ramps.

At 250, a range Doppler map can be generated, which can be based at least in part on the acquisition signals (e.g., via FFTs of the acquisition signals, etc.) and can optionally also be based on the preacquisition signals (e.g., via FFTs of the preacquisition signals, etc.).

At 260, the range Doppler map can be evaluated based at least in part on the interim results (e.g., system and environment parameter determinations, selected CFAR algorithm(s), etc.).

During a next period, method 200 can begin again at 210.

By obtaining interim results from processing preacquisition signals that can be used to reduce time involved in processing the acquisition signals, the entire time between the beginning of acquisition (of the preacquisition signals in embodiments discussed herein) until a decision based on the analysis can be substantially reduced over conventional systems. In one example embodiment, a 15% reduction in reaction time was achieved, which can allow for more effective collision avoidance, etc.

Figure 3:
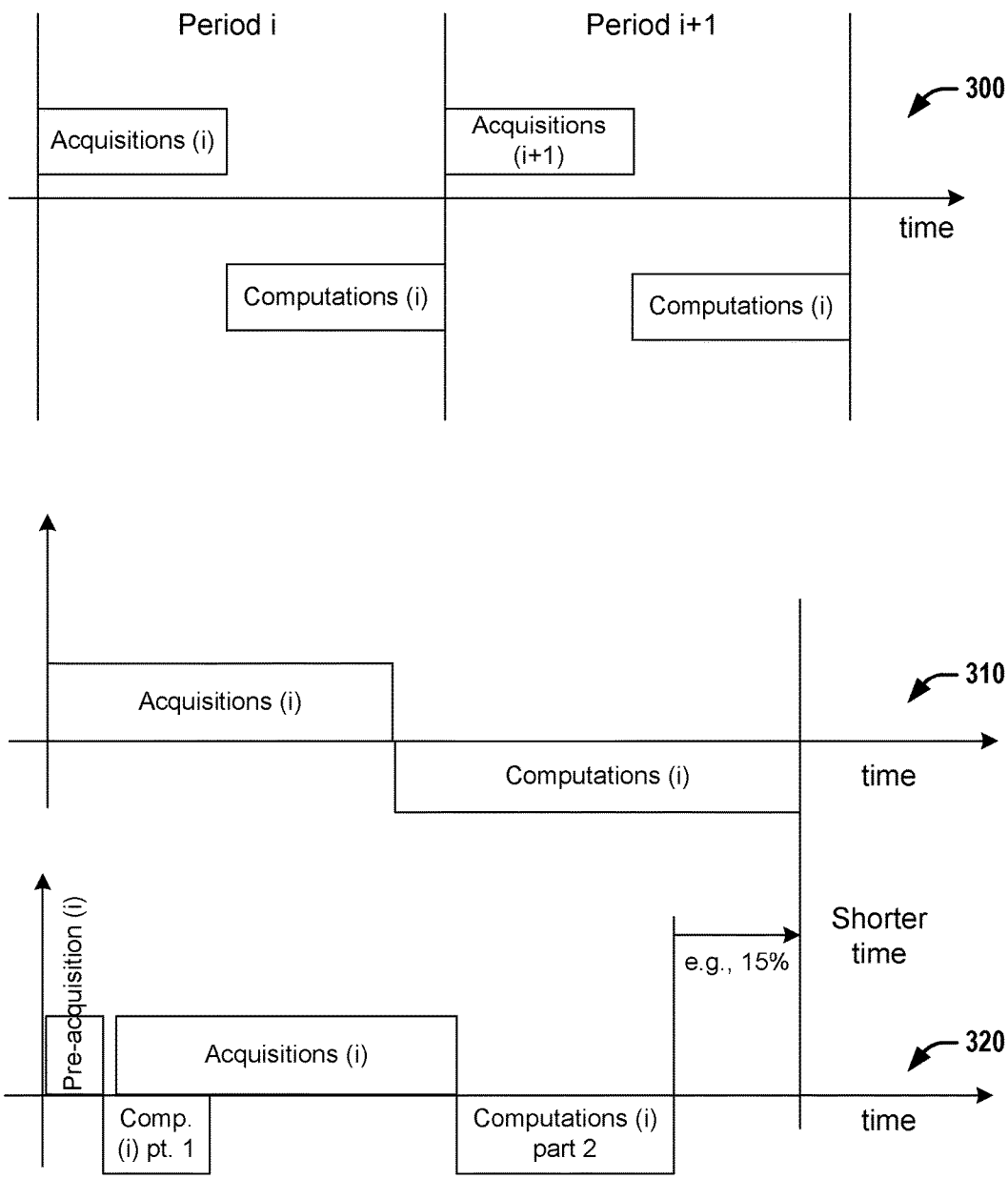
FIG. 3 is a diagram illustrating timing diagrams showing a comparison between a conventional automotive radar system and an example system employing preacquisition ramps according to various aspects described herein.

Referring to FIG. 3, illustrated are timing diagrams for a conventional automotive radar system at 300 and 310, compared with an example system employing preacquisition ramps according to various aspects described herein. As can be seen in 300, showing multiple periods of a timing diagram for a conventional automotive radar system, the system alternates in each period between signal acquisition and computations based on the acquired signal. Conventional improvements have focused on computation performance to reduce the time required during the computation phase, but the basic scheme of alternating between the two has remained unchanged.

At 310 and 320, a comparison is illustrated between timing diagrams for a single period of a conventional system at 310 and an example system employing preacquisition ramps according to various aspects described herein at 320. As can be seen, in contrast to the conventional system at 310, the example system at 320 employs preacquisition ramps to reduce the analysis time of the regular acquisition ramps and reduce the overall system reaction time. The preacquisition ramps are dedicated ramps transmitted and acquired a short time before the main acquisition. By including preacquisition ramps and performing preprocessing based on the preacquisition ramps, the overall reaction time from the beginning of acquisition (of preacquisition ramps) until a decision can be substantially reduced, as seen at 320, showing an example 15% reduction in one example embodiment.

Figure 4:
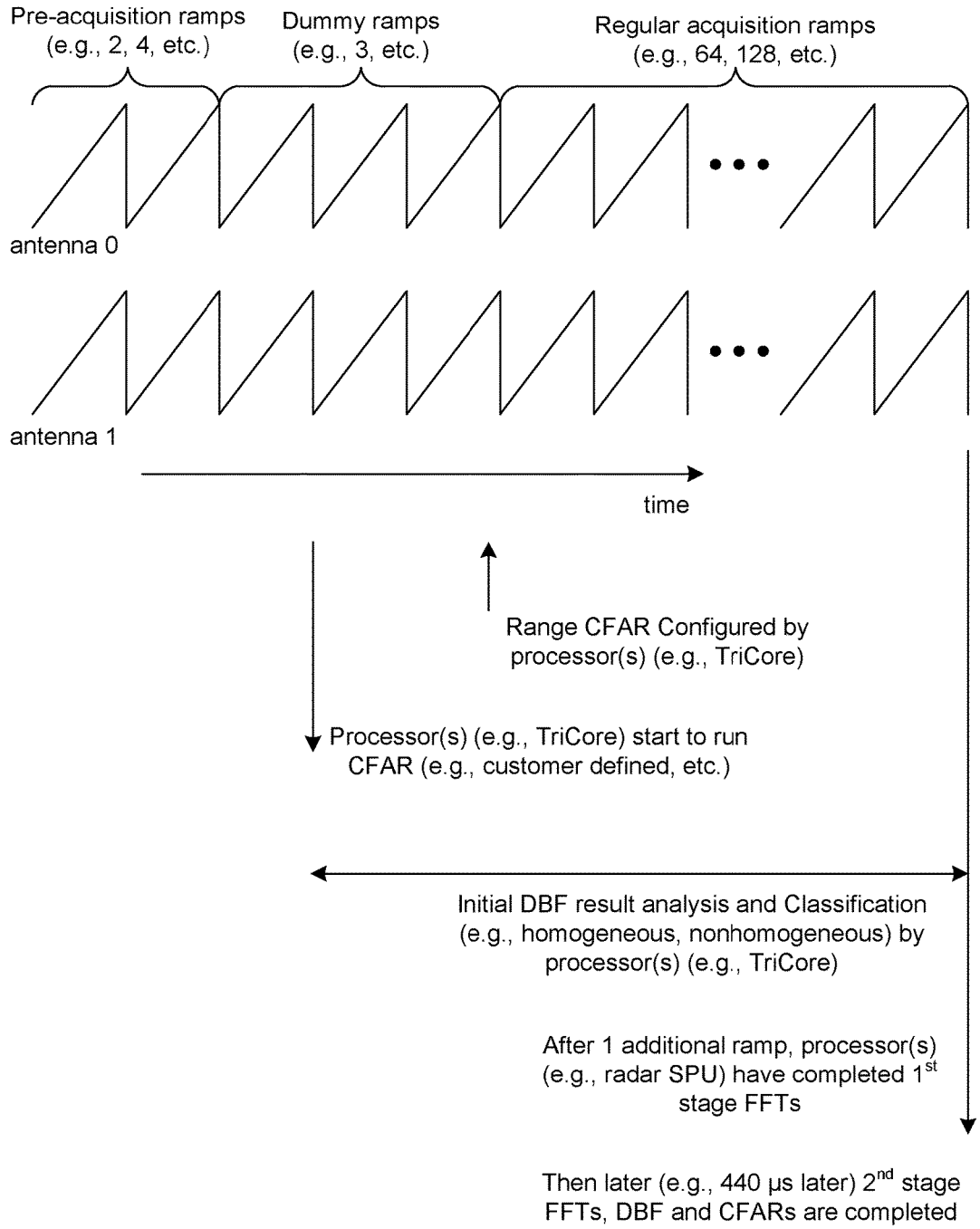
FIG. 4 is a diagram illustrating an example timing diagram for radar employing preacquisition ramps according to various aspects described herein.

Referring to FIG. 4, illustrated is an example timing diagram for an example radar system employing preacquisition ramps according to various aspects described herein. The example radar system associated with the timing diagram of FIG. 4 has two antennas, antenna 0 and antenna 1, but in various embodiments, greater or lesser numbers of antennas can be employed. Additionally, the example system discussed in connection with FIG. 4 employs two processors, a radar SPU and a TriCore processor, but in various embodiments, one processor or more than two processors can be employed.

At the start of the period, a number of preacquisition ramps (e.g., 2, 4, etc.) are done. In one example with 4 ramps and a 20 µs time for each ramp, the preacquisition ramps take 80 µs. In connection with the preacquisition ramps, the radar SPU can perform first stage FFTs, second stage FFTs, and digital beamforming (DBF). By the fifth ramp, the radar SPU has completed the first stage FFTs. After completion of the first stage FFTs, dummy ramps (3 in the example of FIG. 4) can be transmitted while the second stage FFTs and DBF can be performed by the radar SPU and the CFAR(s) can be configured by the TriCore. These can be performed in two clocks per bin, or around 28 µs in an example embodiment with 512 samples per ramp, 4 antennas, and 4 preacquisition ramps. Optionally, the TriCore can configure the one-dimensional CFAR to filter out ranges without valid signals (e.g., 10% to 20%).

After the preacquisition signals and dummy ramps, the regular acquisition ramps can begin. During this time, the TriCore can be analyzing the DBF results over the preacquisition signals to predefine one or more regions, such as homogeneous areas, nonhomogeneous areas, and areas where final classification depends upon DBF over the regular acquisition ramps.

Embodiments disclosed herein can provide for substantial improvements over conventional radar systems based on a variety of aspects. The emission techniques discussed herein add preacquisition ramps before the regular acquisition ramps. Preprocessing based on the preacquisition ramps facilitates analysis of interim results that reduce processing time on the regular acquisition ramps. In one example, applying better filtering parameters determined from preprocessing of preacquisition ramps resulted in a precision gain of 15 dB over conventional systems. Additionally, preprocessing based on preacquisition ramps facilitates faster adaptation to rapidly changing environments, such as rapid changes in external environments or in the system (e.g., MMIC, etc.). In conventional radar systems, adaptation to fast changing environments occurs over two acquisition periods. A typical acquisition period is 256 ramps at around 20 µs per ramp, or approximately 5 ms, thus two acquisitions takes around 10 ms. Including preacquisition ramps increases the total acquisition time (e.g., by 20 µs, etc.), but saves in the computation time and thus total time of a single acquisition period, and substantially saves time (an entire acquisition period, or around 5 ms) in rapidly changing situations. At a speed of 130 km/hr, saving 5 ms is equivalent to a distance of around 20 cm.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A system that facilitates detection via radar, comprising:
   transmitter circuitry configured to transmit a plurality of radar ramps comprising a set of M preacquisition ramps and a set of N acquisition ramps, wherein N is greater than M;
   receiver circuitry configured to receive a set of M preacquisition signals and a set of N acquisition signals, wherein each of the preacquisition signals is based on an interaction between an environment and a distinct preacquisition ramp, and each of the acquisition signals is based on an interaction between the environment and a distinct acquisition ramp; and
   one or more processors configured to:
      perform preprocessing based on the set of preacquisition signals to obtain interim results based on one or more of the environment or the system;
      generate a range Doppler map based at least in part on the set of acquisition signals; and
      evaluate the range Doppler map based at least in part on the interim results.

2. The system of claim 1, wherein the interim results comprise one or more instantaneous parameters associated with the system.

3. The system of claim 2, wherein the one or more instantaneous parameters comprise one or more of a temperature or a voltage associated with the system.

4. The system of claim 1, wherein the interim results comprise one or more environmental conditions associated with the environment.

5. The system of claim 4, wherein the one or more environmental conditions comprise a noise associated with the environment.

6. The system of claim 4, wherein the one or more environmental conditions comprise clutter associated with the environment.

7. The system of claim 1, wherein the one or more interim results identify one or more areas associated with the range Doppler map.

8. The system of claim 7, wherein the one or more interim results comprise a constant false alarm rate (CFAR) algorithm associated with each of the one or more areas.

9. The system of claim 1, wherein M is at least two.

10. The system of claim 1, wherein M is at most sixteen.

11. The system of claim 1, wherein the transmitter circuitry is configured to transmit the plurality of radar ramps via a frequency modulated continuous wave mode of operation.

12. The system of claim 1, wherein the transmitter circuitry is configured to transmit the plurality of radar ramps via a phase modulated continuous wave mode of operation.

13. The system of claim 1, wherein the one or more processors comprise at least a first processor and a second processor, wherein the first processor is configured to perform a plurality of fast Fourier transforms (FFTs) on the set of acquisition signals and the set of pre-acquisition signals and is further configured to perform thresholding based on the set of acquisition signals, wherein the range Doppler map is generated based at least in part on the plurality of FFTs, and wherein the second processor is configured to determine one or more characteristics or parameters associated with the thresholding based at least in part on the set of pre-acquisition signals.

14. A non-transitory machine readable medium comprising instructions that, when executed, cause a monolithic microwave integrated circuit (MMIC) to:
transmit a plurality of radar ramps comprising a set of M preacquisition ramps and a set of N acquisition ramps, wherein N is greater than M;
receive a set of M preacquisition signals, wherein each of the preacquisition signals is based on an interaction between an environment and a distinct preacquisition ramp;
perform preprocessing based on the set of preacquisition signals to obtain interim results based on one or more of the environment or the system;
receive a set of N acquisition signals, wherein each of the acquisition signals is based on an interaction between the environment and a distinct acquisition ramp;
generate a range Doppler map based at least in part on the set of acquisition signals; and
evaluate the range Doppler map based at least in part on the interim results.

15. The machine readable medium of claim 14, wherein the interim results comprise one or more of a temperature or a voltage associated with the MMIC.

16. The machine readable medium of claim 14, wherein the interim results comprise one or more of a noise or a clutter associated with the environment.

17. The machine-readable medium of claim 14, wherein the one or more interim results identify one or more areas associated with the range Doppler map.

18. The machine-readable medium of claim 17, wherein the one or more areas associated with the range Doppler map comprise at least one of a homogeneous area or a nonhomogeneous area.

19. A method of facilitating detection via radar, comprising:
transmitting a plurality of radar ramps comprising a set of M preacquisition ramps and a set of N acquisition ramps, wherein N is greater than M;
receiving a set of M preacquisition signals, wherein each of the preacquisition signals is based on an interaction between an environment and a distinct preacquisition ramp;
performing preprocessing based on the set of preacquisition signals to obtain interim results based on one or more of the environment or the system;
receiving a set of N acquisition signals, wherein each of the acquisition signals is based on an interaction between the environment and a distinct acquisition ramp;
generating a range Doppler map based at least in part on the set of acquisition signals; and
evaluating the range Doppler map based at least in part on the interim results.

20. The method of claim 19, wherein the one or more interim results identify one or more areas associated with the range Doppler map and a constant false alarm rate (CFAR) algorithm associated with each of the one or more areas.

* * * * *